(12) United States Patent
Muttik et al.

(10) Patent No.: US 6,663,000 B1
(45) Date of Patent: Dec. 16, 2003

(54) VALIDATING COMPONENTS OF A MALWARE SCANNER

(75) Inventors: Igor Garrievich Muttik, Berkhamsted (GB); Alexander James Hinchliffe, Milton Keynes (GB); Dirk Kollberg, Ahrensburg (DE)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 10/208,789

(22) Filed: Aug. 1, 2002

(51) Int. Cl.[7] ............................................. G06F 17/00
(52) U.S. Cl. ...................................... 235/375; 235/376
(58) Field of Search ................................. 235/375, 376; 707/10

(56) References Cited

U.S. PATENT DOCUMENTS 6,553,377 B1 * 4/2003 Eschelbeck ................. 235/375

2002/0016959 A1 2/2002 Barton et al.

FOREIGN PATENT DOCUMENTS

JP 7-264179 10/1995

\* cited by examiner

*Primary Examiner*—Harold I. Pitts
(74) *Attorney, Agent, or Firm*—Christopher J. Hamaty; Nixon & Vanderhye P.C.

(57) ABSTRACT

In a malware scanner containing an updating program 20, a malware scanner engine 22 and malware definition data 24, the malware scanner engine 22 and the malware definition data 24 cross-check each other for validity. More particularly, each includes its own signature 26, 30 as well as public key information 28, 32 for checking the other. There is no dependence upon the updating software 20 for information required in the validating of the malware scanner engine 22 or malware definition data 24. The malware definition data 24 can include program code operable to utilize the validating data 32 embedded within the malware definition data 24 for checking the signature 26 of the malware scanner engine 22.

43 Claims, 6 Drawing Sheets

VALIDATING COMPONENTS OF A MALWARE SCANNER

BACKGROUND OF THE INVENTION

1. Field of the Invention

This invention relates to the field of data processing systems. More particularly, this invention relates to the field of malware scanners and the validating of components forming a malware scanner.

2. Description of the Prior Art

It is known to provide malware scanners that comprise multiple components. As an example, a malware scanner resident on a client computer may include an updating component responsible for checking for updates of the other components of the malware scanner and installing those updated components when they become available having first downloaded them from a remote source. Further components will typically provide a malware scanner engine responsible for controlling and directing the malware scanning operation and malware definition data used to identify the different types of malware for which a scan is being made.

As illustrated in FIG. 1 of the accompanying drawings, a malware scanner provider may have a server 2 connected to the internet 4 and upon which server 2 they make available regularly updated malware scanner components, such as malware scanner engines and malware definition data sets, for download. Typically the malware definition data (DAT) will be updated most frequently as new viruses and variants of viruses are encountered. The malware scanner engine will also be updated from time to time, although generally less frequently than the malware definition data. The malware scanning engine may be updated for reasons such as a requirement to support new types of algorithm for scanning for malware.

As illustrated in FIG. 1, individual computers 6 and networks 8 will be connected to the internet 4 and under control of their update programs will periodically check the server 2 to determine whether more up-to-date versions of the malware scanner engine and the malware definition data are available compared to the versions of these components that are currently present. As illustrated, the computer 6 is fully up-to-date and has the latest versions ($V_n$) of both the malware scanner engine and the malware definition data. Conversely, two of the client computers 10, 12 on the network 8 have out of date versions of at least one of the malware scanner components and accordingly are in need of updating by downloading the latest versions of those components from the server 2 or from a locally held copy.

It will be appreciated that malware can include a wide variety of different forms of unwanted material that may be present upon a computer, such as computer viruses, worms, Trojans, banned computer files, documents containing banned words, banned images and the like. It will be understood that in order to provide a high degree of protection against such threats it is important that the components of the malware scanner be regularly and promptly updated as new versions become available. However, this regular and routine updating of malware scanner components introduces a vulnerability into the protection being provided in that these components may be targets for spoofing and tampering by virus writers and viruses. There have been known cases in which false malware definition data updates have been distributed with malicious intent.

In order to provide a defence against tampering and spoofing of malware scanner components it is known to digitally sign and/or encrypt the components. As is illustrated in FIG. 2 of the accompanying drawings, the malware definition data 14 and the malware scanner engine 16 are both signed with a digital signature which has been calculated using a private key of an asymmetric private key/public key encryption mechanism, such as a PGP or the like. The private keys for generating the signature on the malware definition data 14 and the malware scanner engine 16 are secret and known only to the provider of these malware scanner components. The public key necessary for validating the signature on the malware definition data 14 is carried by the malware scanner engine 16. Accordingly, when a new set of malware definition data 14 is loaded, the malware scanner engine 16 may read its signature and validate this using the public key carried by the malware scanner engine 16. In a similar way, the malware scanner engine 16 is digitally signed with a signature derived from a private key known only to the engine provider and the corresponding public key is held within the update software of the client computer and is used to check the signature on the malware scanner engine 16 when a new malware scanner engine 16 is loaded.

It is an object of the present invention to improve the security and ease of maintenance and update of malware scanner systems.

SUMMARY OF THE INVENTION

Viewed from one aspect the present invention provides a computer program product for controlling a computer to validate a plurality of components of a malware scanner, said computer program product comprising:

validating code operable to validate each component of said plurality of components using signature data associated with said component and validating data associated with another of said components such that said plurality of components validate each other.

The invention both recognises and addresses problems associated with the above described prior art techniques. More particularly, the invention recognises that it is difficult and slow to update the updating component of a malware scanner system. Also, the updating component may not be present in some configurations. Accordingly, should it be necessary or desirable to change the public key information held within the update software, then considerable difficulty is encountered in making this change across the user base of the malware scanner. Furthermore, the invention recognises that the protection of the malware scanner engine from tampering or spoofing is in some ways more important than protecting the malware definition data since the malware scanner engine will typically be one or more DLLs with a documented format that may be relatively easily understood, modified and/or patched for malicious purposes. Any modification to the engine (malicious or not) can cause malfunction, false alarms and even a data loss.

In contrast, the malware definition data is much less likely to be spoofed or tampered with since its format is generally undocumented and it may be encrypted or otherwise protected in ways which make it difficult to understand. Having recognised the problem of the difficulty in updating the updating software itself and the relative vulnerability of the malware scanner engine, the present invention addresses these problems by providing a plurality of malware scanner components that cross-check each other without any dependence outside of the group for validation. Thus, for example, the malware scanner engine and the malware definition data may be made to validate each other respectively so that the updating software need carry no public key data and accordingly should a change need to be made in the keys being employed, then no changes are needed in the updating software. This also gives an advantage in a configuration where the scanner software resides on a computer that is not networked and so the updating component may not be installed. Furthermore, placing the public key used to validate the malware scanner engine within the malware definition data makes this more difficult to identify and accordingly generally improves the level of security.

For additional security it may be desirable to store the private key in another component rather then in the one that performs the validation.

Whilst it will be appreciated that the above has discussed malware scanner engine and malware definition data components as particularly suitable for use with the current technique, it will be appreciated that other components within a malware scanner system may be dealt with in the same way and included within a closed group which self-checks one another.

Whilst it will be appreciated that the signature data and the validating data could be associated with the malware scanning components in a variety of different ways, such as within an associated separate file, in preferred embodiments the signature data and the validating data is embedded within the respective component in order to improve security.

The computer program code (validating code) which reads the signatures and validating data and makes the necessary checks could be provided outside of the components themselves, but in preferred embodiments is provided within at least one of the components. Embedding the validating code within the components themselves improves the security of this code and enhances the ability to adapt or update this validating code as may be necessary. As an example, the malware definition data may contain a program in the form of native processor code or in the form of interpretable p-code executed by the malware scanner engine.

Whilst it will be appreciated that a wide variety of different types of signature data and validating data may be used, such as checksum type data, preferred embodiments of the invention utilise private/public encryption key pairs.

Whilst the invention provides improvements in a variety of situations, it is particularly well suited to systems in which the malware scanner components are updateable from a remote source using an updating program. The present technique enables the validation of the components that are updated to be made without dependence upon the updating program. The present technique is equally suitable for systems with or without an updating component.

Other aspects of the present invention provide a method of validating a plurality of components of a malware scanner and an apparatus for validating a plurality of components of a malware scanner.

A further aspect of the invention provides a malware definition data component of a malware scanner, said malware definition data component comprising signature data usable to validate said malware definition data component and validating data usable to validate one or more further components of said malware scanner.

Malware definition data including both its own signature and validation data used to validate one or more further components of a malware scanner provides significant advantages since it gives a degree of security to the validation data, allows the validation data and its associated validating code (algorithm) to be relatively easily modified and utilises known distribution mechanisms for malware definition data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 3A:
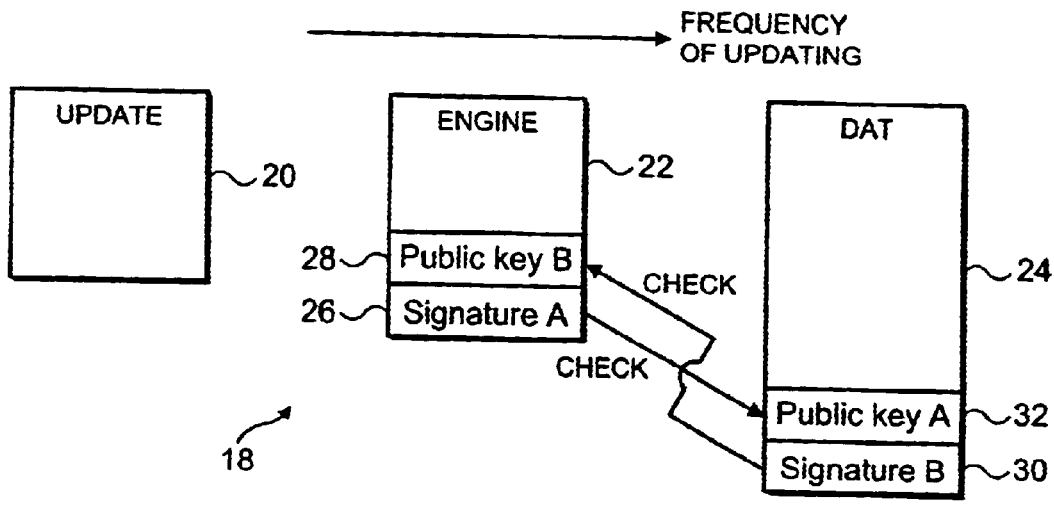
FIG. 3a illustrates an example embodiment of the present invention in which malware definition data and a malware scanner engine both contain their own signature data and validating data for use in validating the other component.

FIG. 3a illustrates a malware scanner 18 which can be considered to be formed of three components, namely an updating program 20, a malware scanner engine 22 and malware definition data 24. The updating program 20 is responsible for checking for the presence of updates to the malware scanner engine 22 and the malware definition data 24 that may become available on the malware provider's server 2 and then downloading those updates as they become available. The malware scanner engine 22 is responsible for controlling and driving the malware scanning operations utilising the malware definition data 24 which characterises the items of malware for which a search is being made. The updating action of the updating software 20 and the malware scanning action of the malware scanner engine 22 and the malware definition data 24 follow those known within the field and will not be described herein in more detail as they are in themselves unaltered by the present technique.

Figure 1:
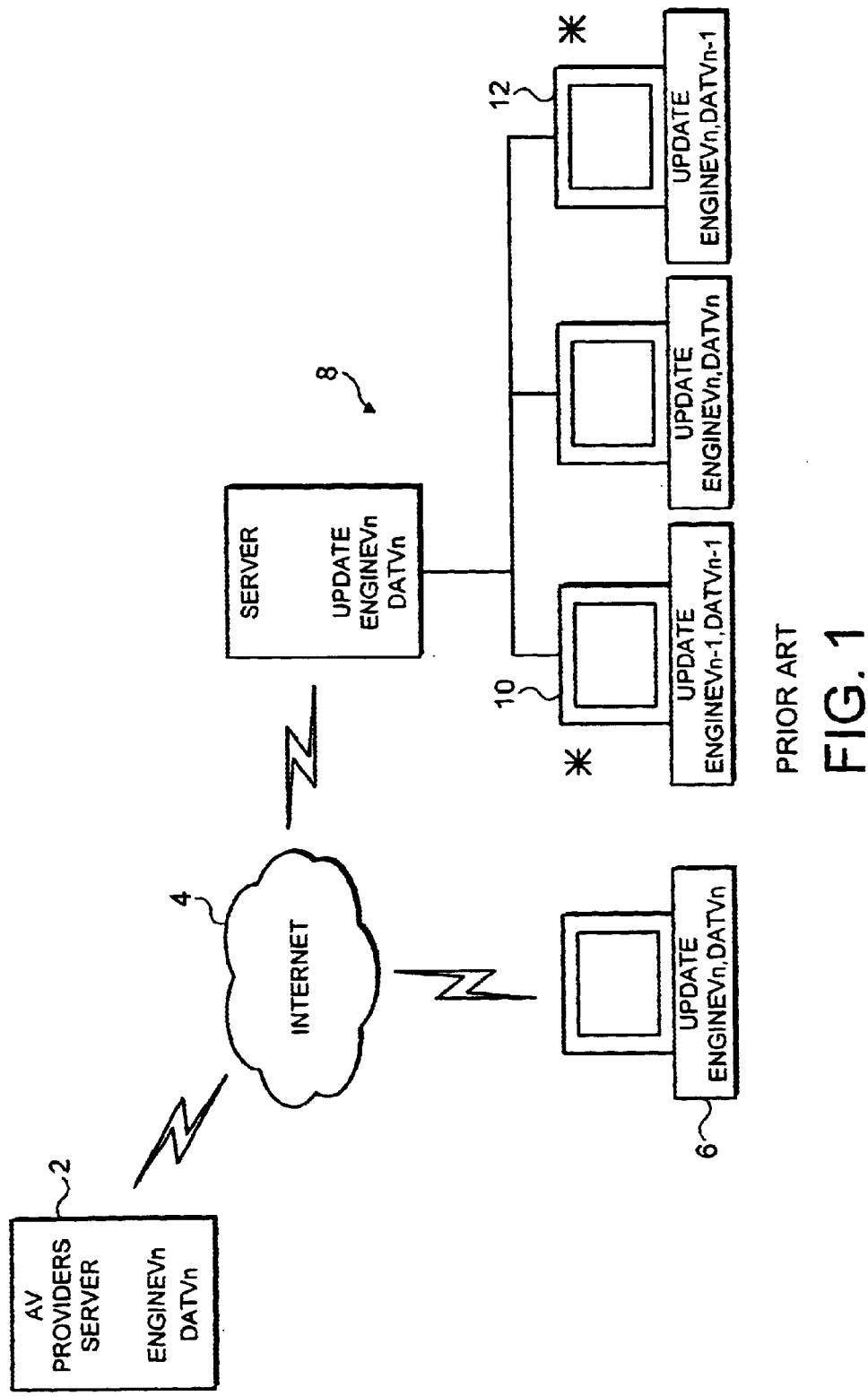
FIG. 1 schematically illustrates the updating of malware definition data and malware scanner engines by downloading from a malware provider's server via the internet.
Figure 2:
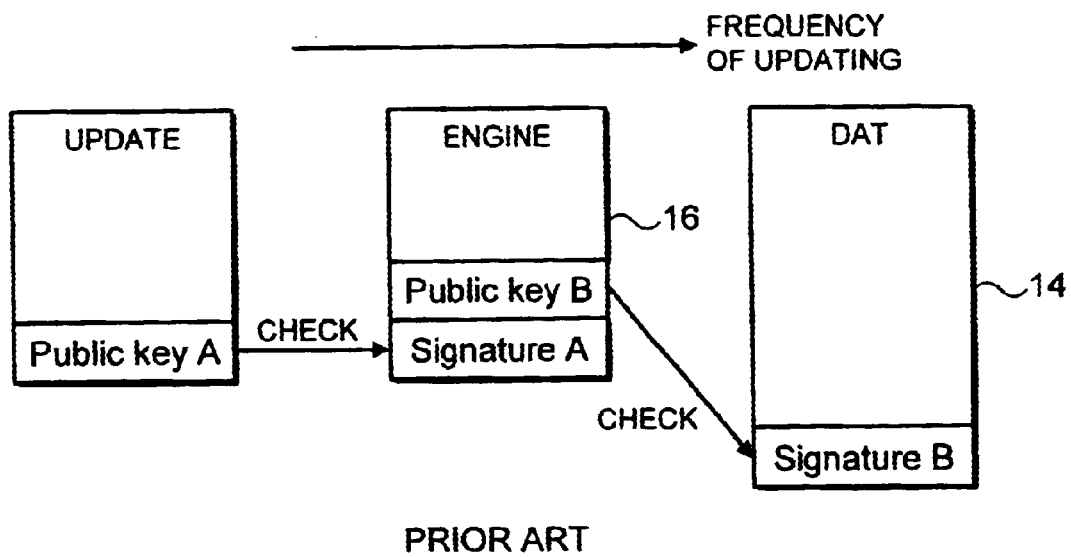
FIG. 2 schematically illustrates the relationship between signature data and validating data among a plurality of malware scanner components.

As previously discussed, the present technique concerns the validation of components of the malware scanner to ensure that they have not been tampered with, spoofed or otherwise subject to malicious interference. As illustrated in FIG. 3, the malware scanner engine 22 is itself signed with a digital signature 26 (such as, for example, a PGP digital signature) as well as containing a public key 28 for use in validating the malware definition data 24. The malware definition data 24 is signed with its own digital signature 30 as well as including validating data 32 which is used in validating the signature associated with the malware scanner engine 22. Thus, it will be seen that the validating data associated with each of the malware components 22, 24 is used to check the signature associated with the other of those components such that the malware scanner engine 22 and malware definition data 24 effectively form a closed group which cross-checks each other for validity using embedded signatures and public keys. The group of malware components formed of the malware scanner engine 22 and the malware definition data 24 comprises components which each contain signature data which is subject to validation using validating data within another member of that group of components. This contrasts with the situation of FIG. 2 in which there is a dependence upon the public key data held within the updating software in order to check the malware scanner engine 16, but the updating software does not itself bear a signature which is checked from another of the malware scanner components.

Figure 3B:
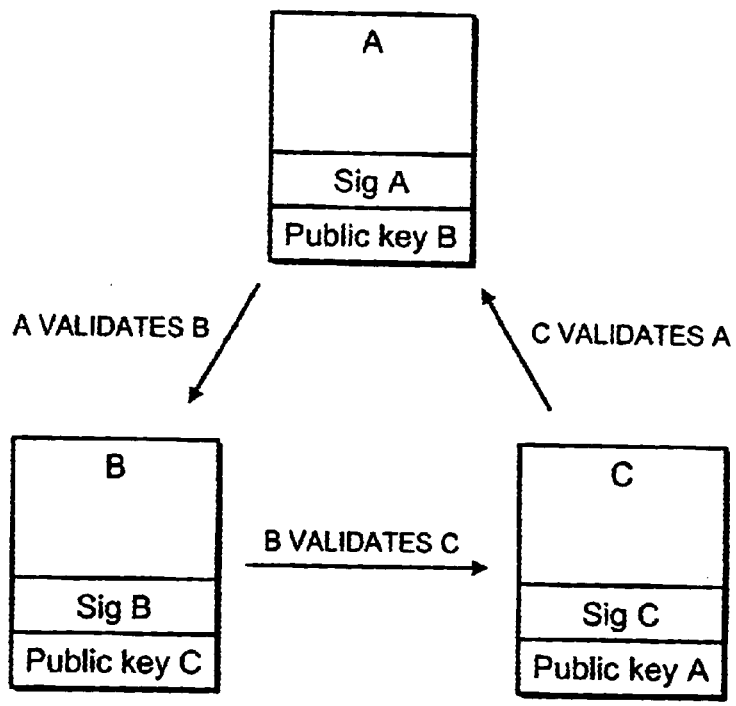
FIG. 3b illustrates an example embodiment in which several components check each other and public keys used for validation are stored in other components

FIG. 3b illustrates three components—A,B,C. Each of these three components holds the signature of itself. Each of the three components performs a validation of one other component. Each component holds a public key that can be used to validate one other component. For example, component A holds: sigA, pubkeyB while component B holds: sigB, pubkeyC and component C holds sigC and pubkeyA. For example, when Component A is executed it would validate component C by first retrieving the public key corresponding to component C from component B and then it can validate component C.

Component A: sigA, pubkeyB—validates C, reads pubkeyC from B

Component B: sigB, pubkeyC—validates A, reads pubkeyA from C

Component C: sigC, pubkeyA—validates B, reads pubkeyB from A

Figure 4:
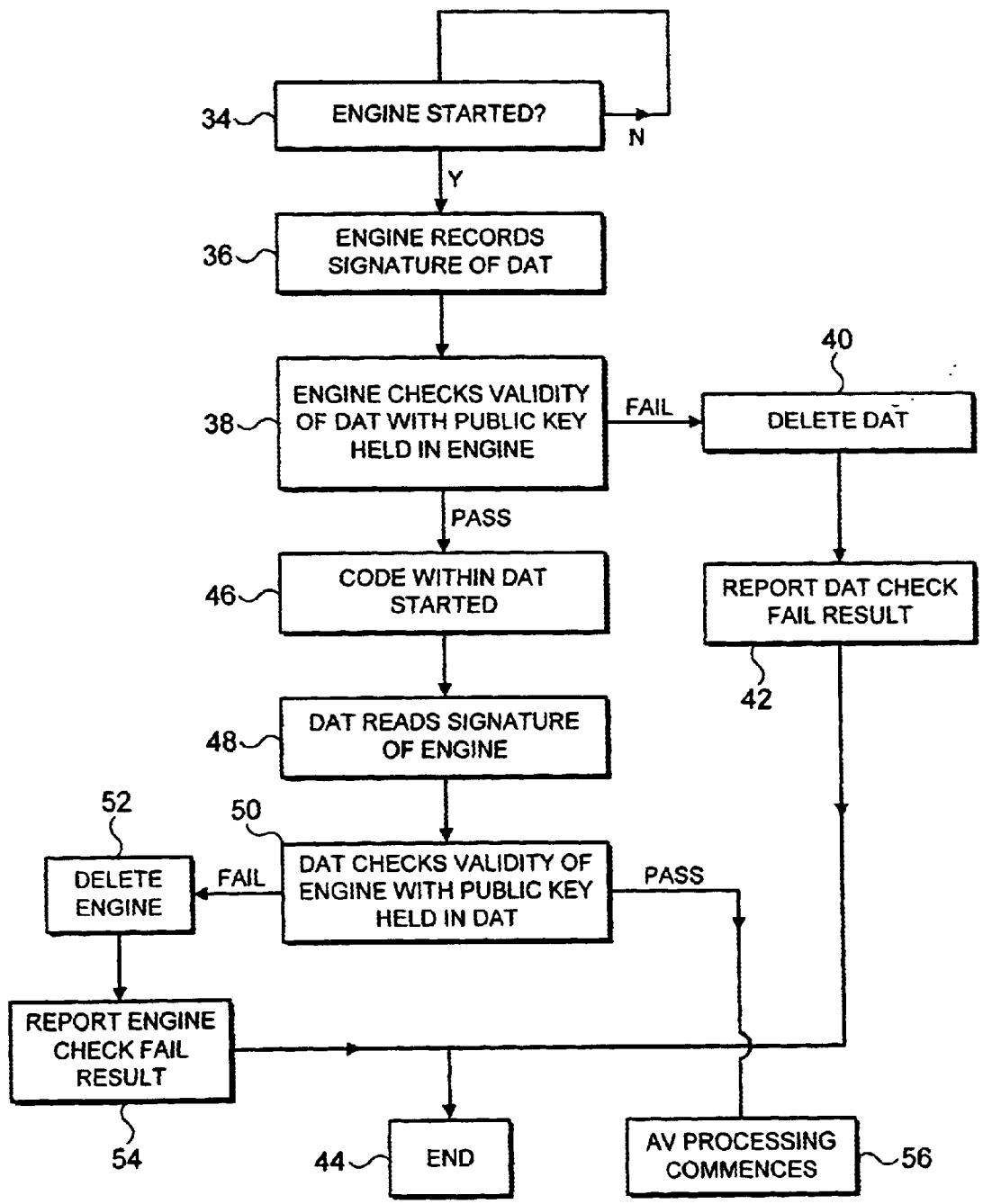
FIG. 4 is a flow diagram schematically illustrating the validation of malware definition data and a malware scanner engine within a malware scanner.

FIG. 4 is a flow diagram schematically illustrating the processing performed in order to validate the malware scanner components of FIG. 3a. At step 34 the system waits for the malware scanner engine to be started. Once the malware scanner engine has been started, processing proceeds to step 36 at which the malware scanner engine reads the signature data associated with the malware definition data. At step 38 the engine checks the validity of DAT file 24 using public key data held within the malware scanning engine.

If the check results in a fail, then processing proceeds to step 40 (which is optional) at which the malware definition data is deleted and then step 42 at which a report is generated to alert the user or Administrator of the failure prior to processing terminating at step 44. It will be appreciated that the deletion of the malware definition data and the generation of the report are only one example of the type of actions that may be taken in dependence upon the result of the checking of the validity data.

If step 38 indicates that the malware definition data passes its validity check, then processing proceeds to step 46 at which program code embedded within the malware definition data is started. This may be directly executable code or p-code, as will be familiar to those in this technical field.

At step 48 the malware definition data code reads the signature associated with the malware scanner engine. At step 50 the validating code within the malware definition data (it can be interpreted p-code) validates the malware scanner engine against the public key data held within the malware definition data. If a validation fail result occurs, then processing proceeds to step 52.

At step 52 (which is optional) the malware scanner engine is deleted and processing proceeds to step 54 where a report of the validation failure of the malware scanner engine is made to the user or Administrator before processing terminates at step 44. Once again, the specific example of the deletion of the malware scanner engine and the generation of a report is only one example of the possible processing that may occur. Alternatives can be a network message, email notification, SMS message, etc.

If the validity check at step 50 resulted in a pass, then processing proceeds to step 56 where normal malware scanning processing commences. It will be appreciated that in the vast majority of cases the malware scanning engine and the malware definition data will both pass their validity checking and processing will proceed to step 56 to commence normal malware scanning.

Figure 5:
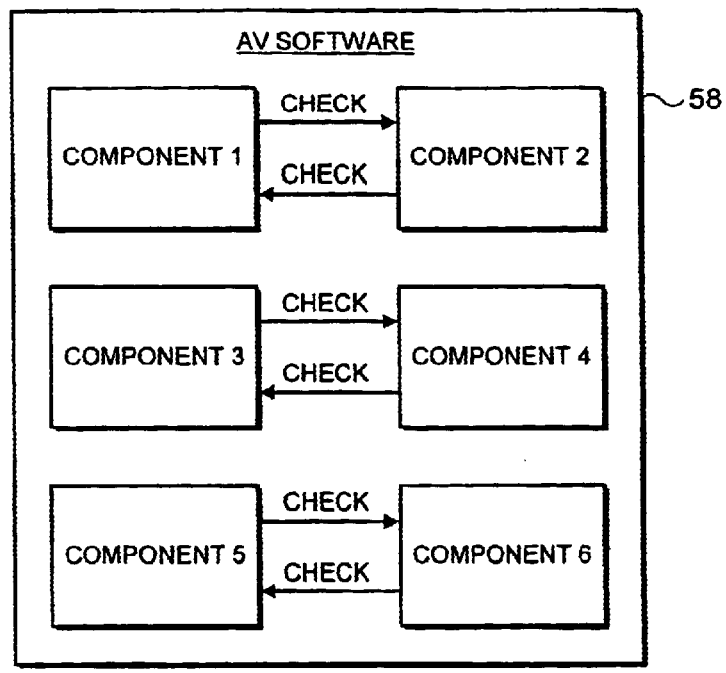
FIGS. 5, 6, and 7 schematically illustrate different cross-checking relationships between components within a malware scanner.

FIG. 5 schematically illustrates a malware scanner 58 comprising multiple components. These components are arranged in pairs with each member of a pair containing its own signature and the validating data associated with its companion within the pair such that the two members of the pair may cross-check each other. Some keys may coincide (same key is used for signing more then one component).

Figure 6:
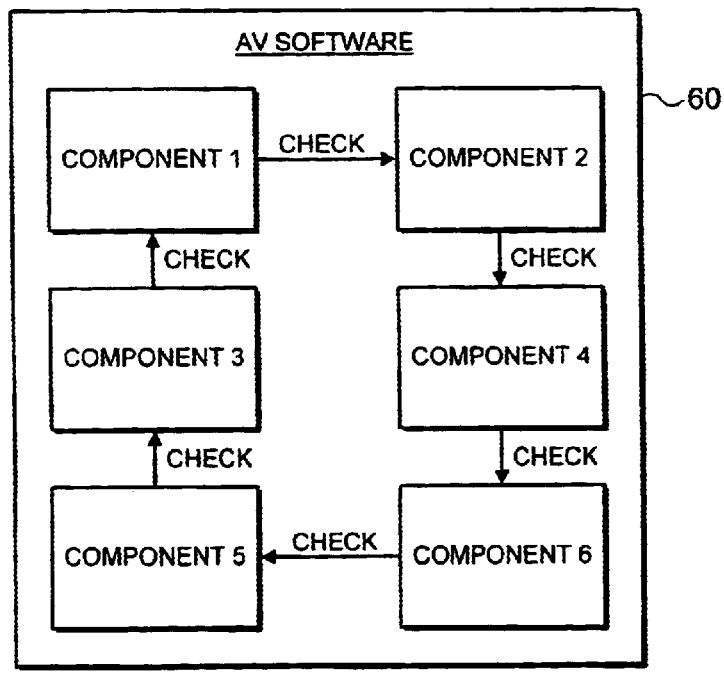

FIG. 6 illustrates another example of a malware scanner 60 in which the components are arranged to cross-check each other in a "circular" arrangement whereby each component contains its own signature and validating data for another component.

Figure 7:
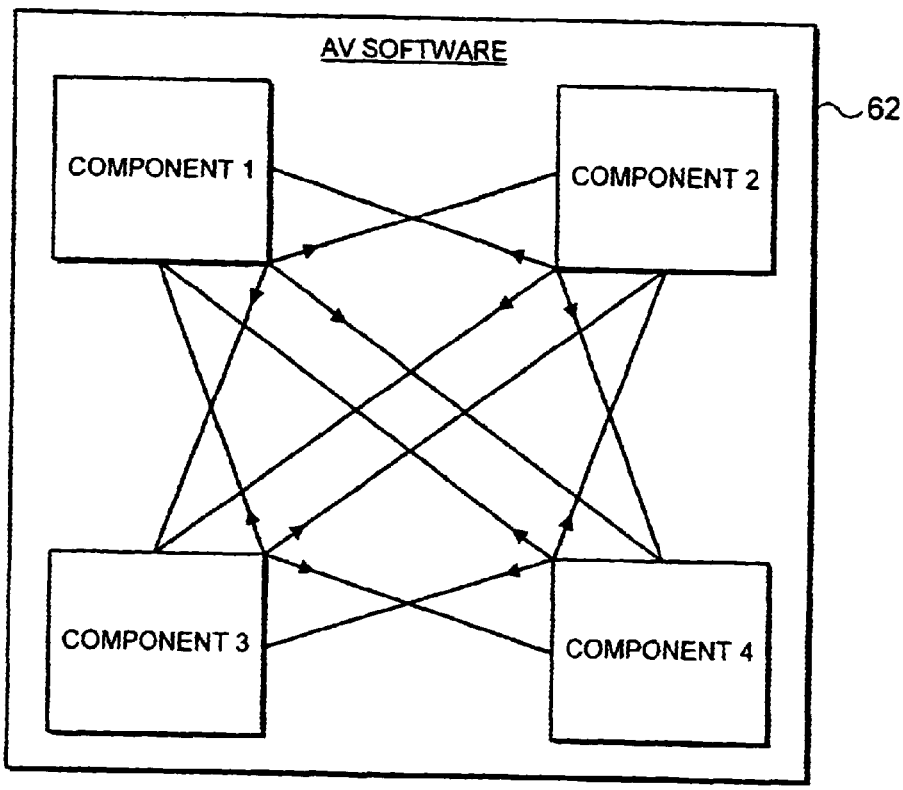

FIG. 7 illustrates another example of a malware scanner 62 comprising components which in this case each contain their own signature together with validating data which can be used to validate the signatures of all of the other components. Thus, component 1 contains its own signature together with the public keys associated with the signatures of components 2, 3 and 4.

It will be appreciated that the example relationships of signatures and validating data within the components of a malware scanner as illustrated in FIGS. 5, 6 and 7 are only some examples of the wide variety of different possibilities that can be envisaged. Combinations of the possibilities illustrated may be made as well as further different relationships.

Figure 8:
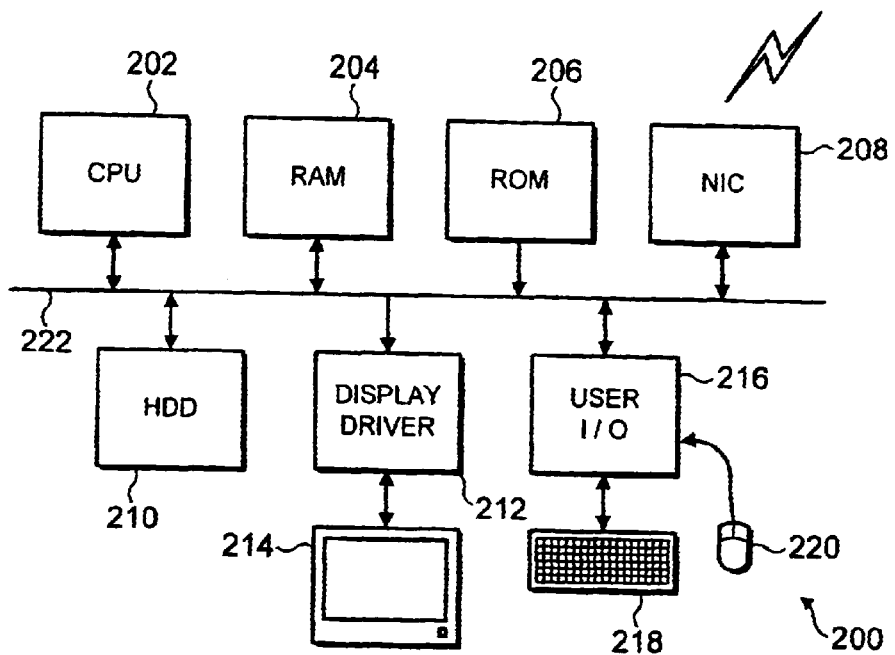
FIG. 8 schematically illustrates the architecture of a general purpose computer that may be used to implement the above described techniques.

FIG. 8 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 8 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A computer program product for controlling a computer to validate a plurality of components of a malware scanner, said computer program product comprising:

validating code operable to validate each component of said plurality of components, another component using signature data associated with said component using validating data associated with another of said components such that said plurality of components validate each other.

2. A computer program product as claimed in claim 1, wherein said plurality of components include one or more of:

a malware scanner engine;

malware definition data; and an updating program.

3. A computer program product as claimed in claim 1, wherein said signature data is within said component to be validated.

4. A computer program product as claimed in claim 1, wherein said validating data is within said another of said components.

5. A computer program product as claimed in claim 1, wherein at least one of said plurality of components includes said validating code.

6. A computer program product as claimed in claim 1, wherein said plurality of components include a malware scanner engine and malware definition data, said malware definition data includes validating data operable to validate signature data of said malware scanner engine and said malware scanner engine includes validating data operable to validate signature data of said malware definition data.

7. A computer program product as claimed in claim 6, wherein said malware definition data includes validating program code operable to use said validating data to validate said signature data of said malware scanner engine.

8. A computer program product as claimed in claim 1, wherein said signature data is generated with a private encryption key and said validating data is a matching public encryption key.

9. A computer program product as claimed in claim 1, wherein said components are updatable components.

10. A computer program product as claimed in claim 9, wherein said components are updated from a remote source.

11. A computer program product as claimed in claim 1, wherein an updating program is operable to update one or more of said plurality of components, said plurality of components being operable to validate each other without dependence upon said updating program.

12. A computer program product as claimed in claim 7, wherein said validating program code within said malware definition data is interpreted by said malware scanning engine.

13. A computer program product as claimed in claim 6, wherein said malware scanner engine is represented by a plurality of components.

14. A method of validating a plurality of components of a malware scanner, said method comprising the steps of:

validating each component of said plurality of components, using signature data associated with said component and validating data associated with another of said components such that said plurality of components validate each other.

15. A method as claimed in claim 14, wherein said plurality of components include one or more of:

a malware scanner engine;

malware definition data; and an updating program.

16. A method as claimed in claim 14, wherein said signature data is within said component to be validated.

17. A method as claimed in claim 14, wherein said validating data is within said another of said components.

18. A method as claimed in claim 14, wherein at least one of said plurality of components includes validating program code operable to use validating data to validate signature data.

19. A method as claimed in claim 14, wherein said plurality of components include a malware scanner engine and malware definition data, said malware definition data includes validating data operable to validate signature data of said malware scanner engine and said malware scanner engine includes validating data operable to validate signature data of said malware definition data.

20. A method as claimed in claim 19, wherein said malware definition data includes validating program code operable to use said validating data to validate said signature data of said malware scanner engine.

21. A method as claimed in claim 14, wherein said signature data is generated with a private encryption key and said validating data is a matching public encryption key.

22. A method as claimed in claim 14, wherein said components are updatable components.

23. A method as claimed in claim 20, wherein said validating program code within said malware definition data is interpreted by said malware scanning engine.

24. A method as claimed in claim 19, wherein said malware scanner engine is represented by a plurality of components.

25. A method as claimed in claim 22, wherein said components are updated from a remote source.

26. A method as claimed in claim 14, wherein an updating program is operable to update one or more of said plurality of components, said plurality of components being operable to validate each other without dependence upon said updating program.

27. Apparatus for validating a plurality of components of a malware scanner, said apparatus comprising:

validating logic operable to validate each component of said plurality of components, using signature data associated with said component and validating data associated with another of said components such that said plurality of components validate each other.

28. Apparatus as claimed in claim 27, wherein said plurality of components include one or more of:

a malware scanner engine;

malware definition data; and an updating program.

29. Apparatus as claimed in claim 27, wherein said signature data is within said component to be validated.

30. Apparatus as claimed in claim 27, wherein said validating data is within said another of said components.

31. Apparatus as claimed in claim 27, wherein at least one of said plurality of components includes said validating code.

32. Apparatus as claimed in claim 27, wherein said plurality of components include a malware scanner engine and malware definition data, said malware definition data includes validating data operable to validate signature data of said malware scanner engine and said malware scanner engine includes validating data operable to validate signature data of said malware definition data.

33. Apparatus as claimed in claim 32, wherein said malware definition data includes validating program code operable to use said validating data to validate said signature data of said malware scanner engine.

34. Apparatus as claimed in claim 27, wherein said signature data is generated with a private encryption key and said validating data is a matching public encryption key.

35. Apparatus as claimed in claim 27, wherein said components are updatable components.

36. Apparatus as claimed in claim 35, wherein said components are updated from a remote source.

37. Apparatus as claimed in claim 33, wherein said validating program code within said malware definition data is interpreted by said malware scanning engine.

38. Apparatus as claimed in claim 32, wherein said malware scanner engine is represented by a plurality of components.

39. Apparatus as claimed in claim 27, wherein an updating program is operable to update one or more of said plurality of components, said plurality of components being operable to validate each other without dependence upon said updating program.

40. A malware definition data component of a malware scanner, said malware definition data component comprising signature data usable to validate said malware definition data component and validating data usable to validate one or more further components of said malware scanner.

41. A malware definition data component as claimed in claim 40, wherein said validating data is usable to validate a malware scanner engine of said malware scanner.

42. A malware definition data component as claimed in claim 40, comprising validating code operable to use said validating data to validate one or more further components of said malware scanner.

43. A malware definition data component as claimed in claim 40, wherein said signature data is generated with a private encryption key and said validating data is a public encryption key for use in validating said one or more further components of said malware scanner.

* * * * *